(12) United States Patent
Burnett et al.

(10) Patent No.: US 10,631,467 B1
(45) Date of Patent: Apr. 28, 2020

(54) ROTARY PLANT CUTTER

(71) Applicants: Brian Burnett, Bellingham, WA (US); Jesse O. Burnett, Everson, WA (US)

(72) Inventors: Brian Burnett, Bellingham, WA (US); Jesse O. Burnett, Everson, WA (US)

(*) Notice: Subject to any disclaimer, the term of this patent is extended or adjusted under 35 U.S.C. 154(b) by 0 days.

(21) Appl. No.: 16/209,098

(22) Filed: Dec. 4, 2018

Related U.S. Application Data

(60) Provisional application No. 62/594,401, filed on Dec. 4, 2017.

(51) Int. Cl.
*A01G 3/00* (2006.01)
*B02C 18/12* (2006.01)
*B02C 7/08* (2006.01)

(52) U.S. Cl.
CPC .......... *A01G 3/002* (2013.01); *B02C 7/08* (2013.01); *B02C 18/12* (2013.01); *A01G 2003/005* (2013.01); *B02C 2201/066* (2013.01)

(58) Field of Classification Search
CPC .......... A01G 3/00; A01G 3/002; A01G 3/005; B02C 2201/066; B02C 18/12; B02C 7/08
USPC ............... 83/663, 673–676; 460/134–135; 131/313, 319–320, 322; 241/188.1, 253, 241/261.2
See application file for complete search history.

(56) References Cited

U.S. PATENT DOCUMENTS

| | | | | |
|---|---|---|---|---|
| 1,983,441 A | * | 12/1934 | Dowling | A23N 5/00 460/123 |
| 3,608,838 A | * | 9/1971 | Lundin | B02C 18/12 241/55 |
| 5,085,375 A | * | 2/1992 | Haworth | B02C 18/12 241/282.2 |
| 7,121,486 B1 | * | 10/2006 | Shimizu | B02C 18/083 241/69 |
| D755,263 S | | 5/2016 | Raichart | |
| 2011/0240776 A1 | * | 10/2011 | Buranov | B24B 19/22 241/101.01 |
| 2015/0027096 A1 | * | 1/2015 | Black | A01D 34/82 56/10.1 |
| 2016/0039105 A1 | | 2/2016 | Raichart | |

* cited by examiner

*Primary Examiner* — Alicia Torres
(74) *Attorney, Agent, or Firm* — Schacht Law Office, Inc.; Dwayne Rogge

(57) ABSTRACT

A rotary plant cutter, in one example comprising: a base frame; a drum supported by the base frame; a first disk mounted within the drum and fixed to the drum; the first disk having surfaces defining a plurality of radial slots through the first disk; a second disk mounted within the drum adjacent to and above the first disk; the second disk configured to rotate relative to the first disk about a rotational axis; a drive unit having a housing fixed to the drum; and the drive unit having a shaft coupled to rotate the second disk relative to the first disk.

17 Claims, 3 Drawing Sheets

ROTARY PLANT CUTTER

RELATED APPLICATIONS

This application claims priority benefit of U.S. Provisional Ser. No. 62/594,401 filed on Dec. 4, 2017, incorporated by reference.

BACKGROUND OF THE DISCLOSURE

Field of the Disclosure

This disclosure relates to the field of devices to cut and separate first parts of a plant such as for example leaves and stems from second parts of the plant such as for example stems.

BRIEF SUMMARY OF THE DISCLOSURE

Disclosed here in is a rotary plant cutter, in one example comprising: a base frame; a drum supported by the base frame; a first disk mounted within the drum and fixed to the drum; the first disk having surfaces defining a plurality of radial slots through the first disk; a second disk mounted within the drum adjacent to and above the first disk; the second disk configured to rotate relative to the first disk about a rotational axis; a drive unit having a housing fixed to the drum; and the drive unit having a shaft coupled to rotate the second disk relative to the first disk.

The rotary plant cutter as disclosed may be arranged wherein the first disk is in continuous contact with the second disk.

The rotary plant cutter as disclosed may be arranged wherein at least some of the surfaces defining a plurality of radial slots through the first disk extend radially at least 75% of the radius of the first disk.

The rotary plant cutter as disclosed may further comprise a first brush positioned above the second disk and substantially in contact with the second disk.

The rotary plant cutter may also comprise a second brush positioned above the second disk and substantially in contact with the second disk, the second brush circumferentially offset from the first brush.

The rotary plant cutter may also comprise a third brush positioned above the second disk and substantially in contact with the second disk, the third brush circumferentially offset from the first brush and the second brush.

The rotary plant cutter may be arranged wherein the brush rotates relative to the second disk.

The rotary plant cutter may alternatively be arranged wherein the brush rotates relative to the drum.

The rotary plant cutter as disclosed may be arranged wherein the brush is coupled to the shaft of the drive unit to rotate relative to the drum.

The rotary plant cutter may be arranged wherein the drum is pivotably mounted to the base. The rotary plant cutter may be arranged wherein the drum is rotatably mounted to the base through an angle of greater than 90°.

The rotary plant cutter may include a first receiving basket placed under the drum during operation so as to receive cut material passing through the first disk and second disk.

The rotary plant cutter may also comprise a second receiving basket placed under the drum during operation, the second receiving basket configured to receive material not passing through the first disk and second disk when the drum is rotated through an angle of greater than 90°.

The rotary plant cutter may further comprise a lifter arm extending outward from the radial center of the second disk toward the drum, the lifter arm comprising a forward surface at an angle of between 10° and 80° of the second disk.

The rotary plant cutter may be arranged wherein the lifter arm is mounted to rotate about the rotational axis of the second disk.

The rotary plant cutter may be arranged wherein the lifter arm is mounted to rotate about the rotational axis of the second disk at a different angular velocity than the second disk relative to the drum.

DETAILED DESCRIPTION OF THE DISCLOSURE

Figure 1:
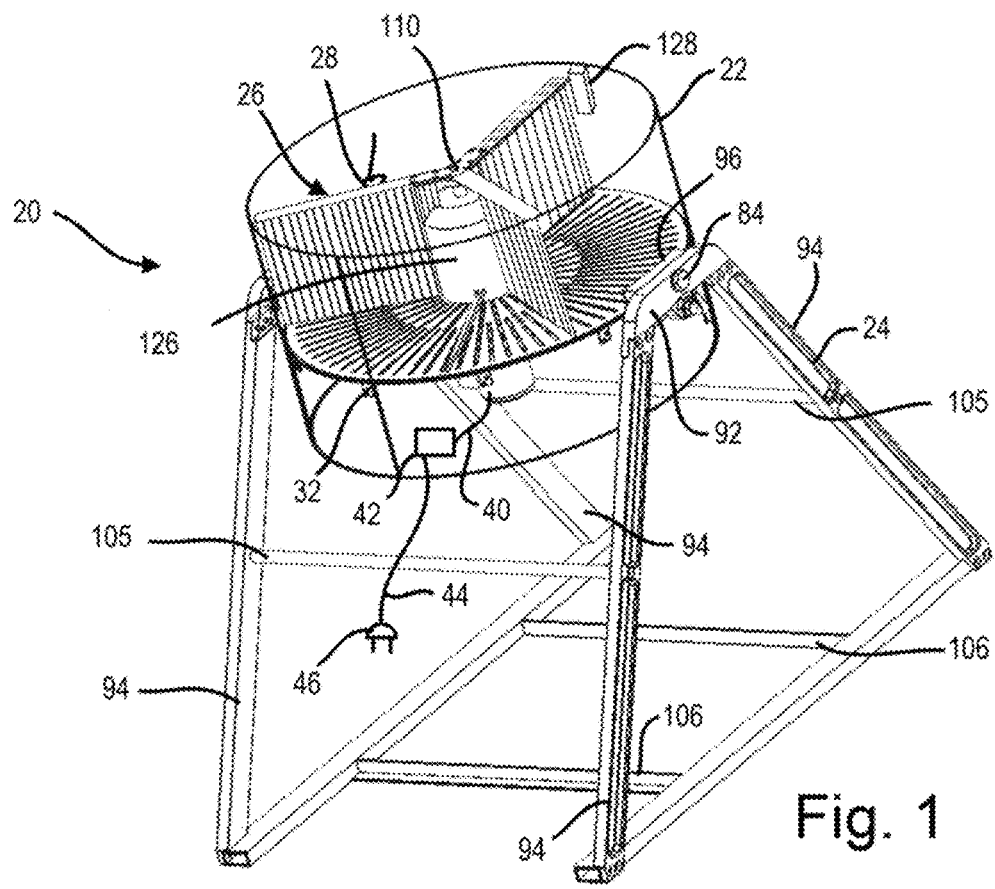
FIG. 1 is a perspective view of one example of the disclosed rotary plant cutter.

Disclosed herein is a rotary plant cutter 20 comprising a drum 22 mounted to a base frame 24. The drum 22 contains a cutter assembly 26 used to separate plant matter 28 into first and second components for example leaves and stems while cutting or chopping the first components. In use, plant matter 28 is placed into the drum 22 and the cutter assembly 26 is engaged (turned on) so as to rotate several components relative to the drum 22. The cutter assembly 26 then separates first (softer and/or smaller) parts of the plant matter 28 such as leaves, buds, and flowers from harder second (larger and/or harder) parts of the plant matter 28 such as stems.

Figure 5:
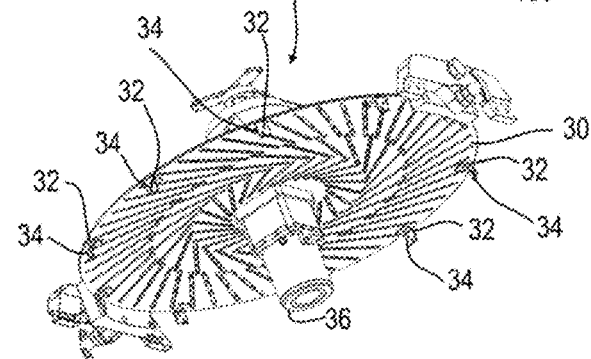
FIG. 5 is a bottom perspective view of the components shown in FIG. 4.

Looking to FIG. 5, it can be seen that in this example, the cutter assembly 26 comprises a first (lower) disk 30 which is mounted to the drum 22 by way of fasteners 32 engaging tabs 34 attached to the first disc 30 and the drum 22. A drive unit 36 is also provided in this example, mounted by way of fasteners passing through surfaces defining voids 38 to the first disc 30 so as to mount the non-rotating housing of the drive unit 36 to the first disk 30 so that the housing of the drive unit 36 is held in place relative to the first disk 30 and drum 22.

To provide electric power, speed control, and directional control to the drive unit 36 in one example, the drive unit 36 in one example is electrically coupled by way of wire 40 to a control board 42. In turn, the control board 42 may be may be connected by way of wire 44 to a power supply 46 such as a power plug etc. The control board 42 may include a power switch, controlling power from the plug 46 to the drive unit 36. In one example, the control board 42 including a reversing switch controlling the direction at which the drive unit rotates. In another example, the drive unit 36 may be hand actuated, hydraulic, pneumatic, internal combustion engine, powered by a power cell, battery, solar, wind or water turbine, etc. The drive unit 36 on one example having a drive shaft 48 (see FIG. 13) extending from, the drive unit and connected to a second (upper) disk 50. Thus, actuation of the drive unit 36 causes the second disk 50 to rotate relative to the first disc 30, and drum 22.

Figure 6:
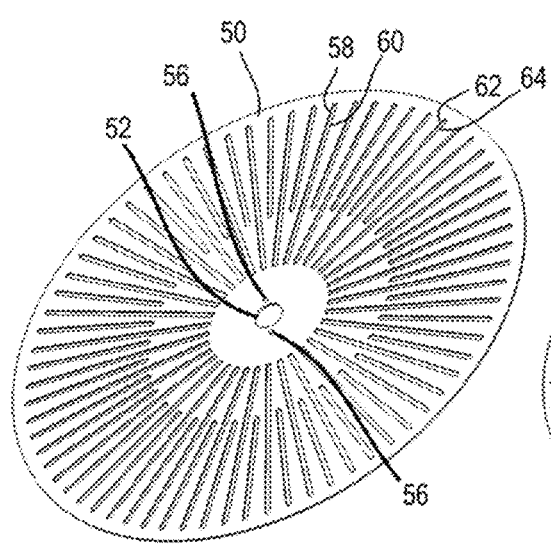
FIG. 6 is a perspective view of the (upper) second disk component of the example shown in FIG. 1.

One arrangement of the second disk 50 can be seen in FIG. 6 including a surface defining a void 52 at the radial center of the second disk 50 through which the shaft 48 passes. The shaft 48 having at one region a key way allowing for mounting of the second disk 50 and/or a lifter hub 54. The lifter hub 54 in one example is attached by way of fasteners passing through surfaces defining voids 56 in the second disk 50 and attached thereto so as to fix the second disk 50 to the shaft 48. Thus rotational torque exerted by the driveshaft 48 is transferred to the second disk 50 inducing rotation of the second disk 50 relative to the first disk 30 and drum 22. As the second disk 50 has a plurality of surfaces 58 defining radially extending voids 60 as well as surfaces 62 defining partial radially extending voids 64, plant matter may fit into and pass through the voids 60/64 and engage the first disk 30 positioned there below.

Figure 7:
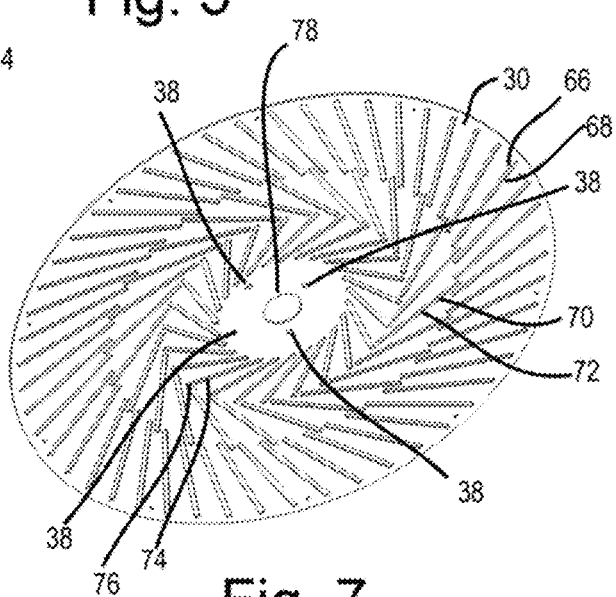
FIG. 7 is a perspective view of the (lower) first disk component of the example shown in FIG. 1.

Looking to FIG. 7 it can be seen that the first disk 30 of this example comprises similar surfaces 66 comprising first partially tangential voids 68 as well as an inner ring of surfaces 70 defining second partially tangential voids 72 and in this example a third ring of surfaces 74 comprising third partially tangential voids 76. In one example the voids 68/72/76 are not aligned directly with a line radiating from the center of the surface 78 through which the driveshaft 48 passes but rather are aligned partially tangential thereto. Thus, as the second disk 50 rotates relative to the first disk 30, a plant material that passes through the voids 60/64 as well as through any of the voids 68/72/76 will be cut/severed as the edges of the associated surfaces overlap in a scissor-like action. Whereas the voids 68/72/76 are tangential, and the voids 60/64 are radial, the result is a shearing action with less of a radial force exerted upon the plant matter in a moving shear point action compared to a flat line slicing action.

Figure 8:
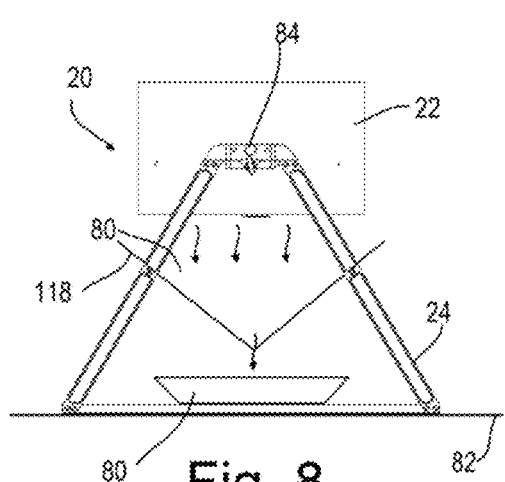
FIG. 8 is a side view of the example of FIG. 1 with the drum component in a first rotational position.
Figure 10:
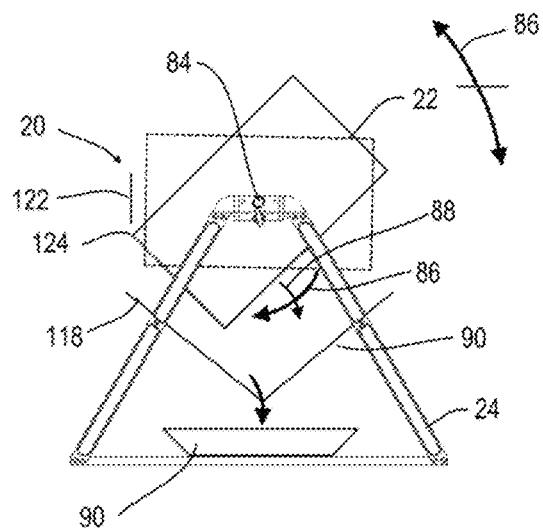
FIG. 10 is a side view of the example of FIG. 1 with the drum component in a third rotational position, or fourth rotational position, dumping into a receiving basket.

Looking to FIG. 8 it can be seen that as the plant matter 28 passes through the second disk 50 and first disk 30 and is cut, the cut matter drops by gravity onto a catch tray 118 having in one example a surface defining a hole 120 therethrough. The cut matter then slides along the catch tray 118, through the hole 120 into a first receiving bin 80 or basket. In one example, the catch tray 118 and/or the receiving bin 80 extend horizontally outward to or beyond the outer edges of the drum 22 as shown in FIG. 8. This ensures that material exiting the drum 22 during operation, or during rotation of the drum for dumping etc. falls onto the catch tray 118. In FIG. 10 for example it can be seen that as the drum 22 rotates for dumping, the catch tray 118 and/or bin 90 extends horizontally outward past a line 122 representing the horizontally outward edge 124 of the drum 22 in a rotated position.

In one example, the first receiving basket 80 may rest upon the floor 82 as shown in FIG. 8. In one example the catch tray 118 rests above the receiving basket 80 to direct plant matter into the receiving basket 118. In one example the receiving basket 80 may be supported by the base frame 24 above the floor 82. In one example the catch tray 118 may be supported by the base frame 24 above the floor 82 and receiving basket 80.

During operation, as plant matter 28 is placed into the rotary plant cutter 20, while the second disk 50 rotates relative to the first disk 30; the plants are cut in such a way as to separate components of the plant matter 28. Due to the relative thinness of the voids 60/64/68/72/76 of the first disk 30 and second disk 50 compared to the plant matter 28, the leaves, buds, and potentially flowers of the plant matter 28 pass through the second disk 50 and are cut, passing through the cutter assembly 26 through the drum 22 to the catch tray 118 and/or receiving basket 80 whereas the harder and relatively larger stems and branches etc. do not pass there through and remain in the drum 22 for later removal as depicted in FIG. 9, 10.

Once the operator has determined that the plant matter 28 has been sufficiently processed via the cutter assembly 26 such that a desired amount of the plant matter has passed through the cutter assembly 26 and a desired condition of the remaining pant matter in the drum is achieved, the non-desired plant material such as only the stems, stalks, or other non-desired portion of the plant matter 28 remains in the drum 22.

Looking to FIG. 8 is shown an example where the drum 22 is coupled to the base frame 24 by way of a pivot 84 and a latching system. Looking to FIG. 8 is shown the rotary plant cutter 20 in a first rotational position wherein the drum 22 is substantially horizontal such that the second disk 50 and first disk 30 lie substantially on a horizontal plane. Looking to FIG. 9, the drum 22 has been rotated about 45° around the pivot 84 in direction of rotation 86 through an angle less than 90°. In one example, the drum 22 is in a position where in the rotary plant cutter 20 can be operated in this position for specific cutting/chopping/separating desires. In another example, the drum 22 continues to rotate from the position shown in FIG. 9 through direction of rotation 86 through an angle of 90° or greater than 90° from that shown in FIG. 8, as depicted in FIG. 10 such that any plant material 28 remaining within the drum 22 is discharged 88 into a second receiving bin 90. In alternative example, the first receiving bin 80 and second receiving bin 90 are the same physical component, with a cleaning stage between the two discharge collections.

Figure 9:
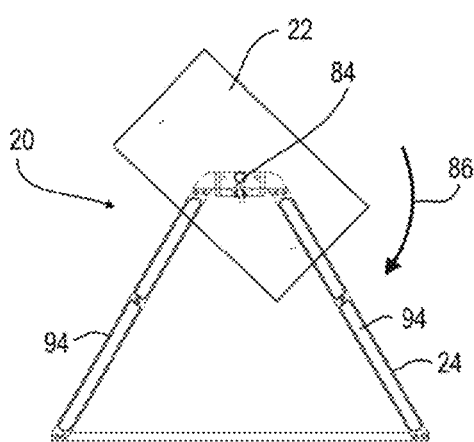
FIG. 9 is a side view of the example of FIG. 1 with the drum component in a second rotational position.
Figure 11:
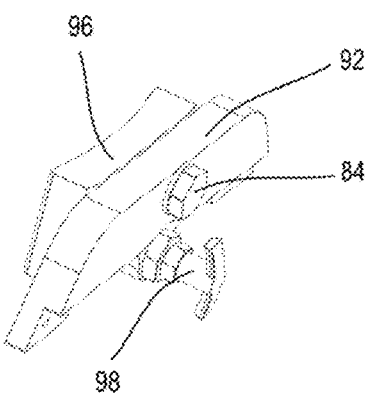
FIG. 11 is an enlarged view of several components shown in FIG. 1.
Figure 12:
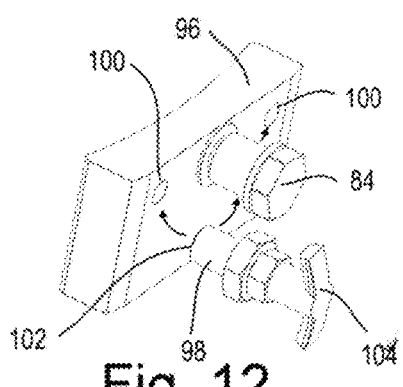
FIG. 12 is and enlarged view of several components shown in FIG. 1.

While several different pivot and latch systems can be utilized to maintain the drum 22 in different positions as shown in FIG. 8-10, one example is shown herein specifically in FIGS. 11-12 comprising a support bracket 92 optionally mounted to the legs 94 of the base frame 24. In one example this is facilitated via a drum bracket 96 mounted through pivot 84 to the support bracket 92 and mounted by way of fasteners, adhesives, welding etc. to the drum 22. In addition to the pivot 84, a pivot latch pin 98 may be mounted to the support bracket 92 with an extension fitting into one of several latch pin receivers 100/102 in the drum bracket 96. In example shown, the pivot latch pin 98 is affixed to a pin release handle 104 which may be pulled outward, away from the drum bracket 96 to release the pivot latch pin 98 from the pin receivers 100/102 so as to allow rotation 86 of the drum 22 as shown in FIGS. 9-10. The upright pin receiver 102 maintaining the drum 22 in the position shown in FIG. 8, 9, 10 whereas the pin receivers 100 allow rotation and indexing of the bin 22 in various positions depending upon their position about the pivot 84 for example to index and secure the drum 22 in the position shown in FIG. 10 for discharge 88 of the remaining plant material 28.

The base frame 24 in one example not only includes support legs 94, and support bracket 92 but also comprises cross members 105 to add rigidity and support to the base frame 24.

Looking to FIG. 1, the drum 22 of this example is shown substantially transparent to more easily view the components internal thereto including the cutter assembly 26. The cutter assembly 26 configured to process (cut/chop/separate) the plant material 28 i.e. leaves and buds from stems and stalks. These processing components are more easily seen in FIG. 4. At least one example of drive unit 36 has already been explained.

Figure 13:
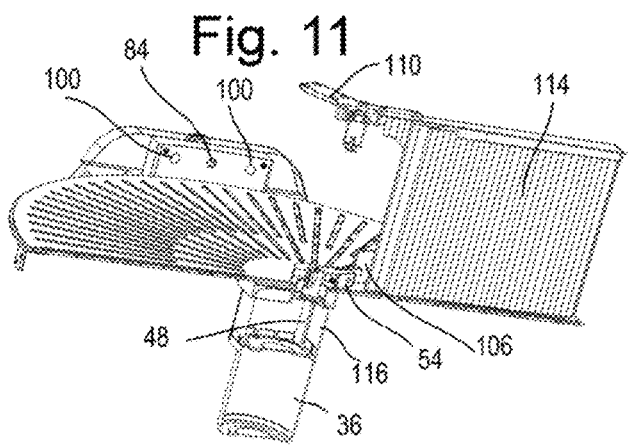
FIG. 13 is a cutaway view of several components shown in FIG. 1.

In this example it can be seen that a lifter arm 106 is attached to the lifter hub 54 (see FIG. 13). Looking to FIG. 4 it can be seen that the lifter hub 54 of this example has extensions attaching to lifter arms 106. In one example the lifter arms are provided on opposing radial sides of the driveshaft 48. In other examples one, three, or other numbers of lifter arms 106 can be coupled to the lifter hub 54 or alternatively to the drum 22. The lifter arms 106 may be fixed to rotate relative to the second disk 50, fixed to the drum 22, fixed to the drive shaft 48, or a second drive shaft rotating at a speed or direction different than the shaft 48, or otherwise mounted to the rotary plant cutter 20. In one example, the lifter arms 106 have an upper (forward facing) surface 108 at an incline of greater than 5° and less than 85° relative to the upper surface of the second disk 50. Thus, plant matter contacts the upper surface 108 and is lifted away from the second disk 50 so that other parts of the plant matter will return to contact the second disk 50, and wherein plant parts pass through the second disk 50 and first disk 30 they will be further processed (chopped).

Figure 2:
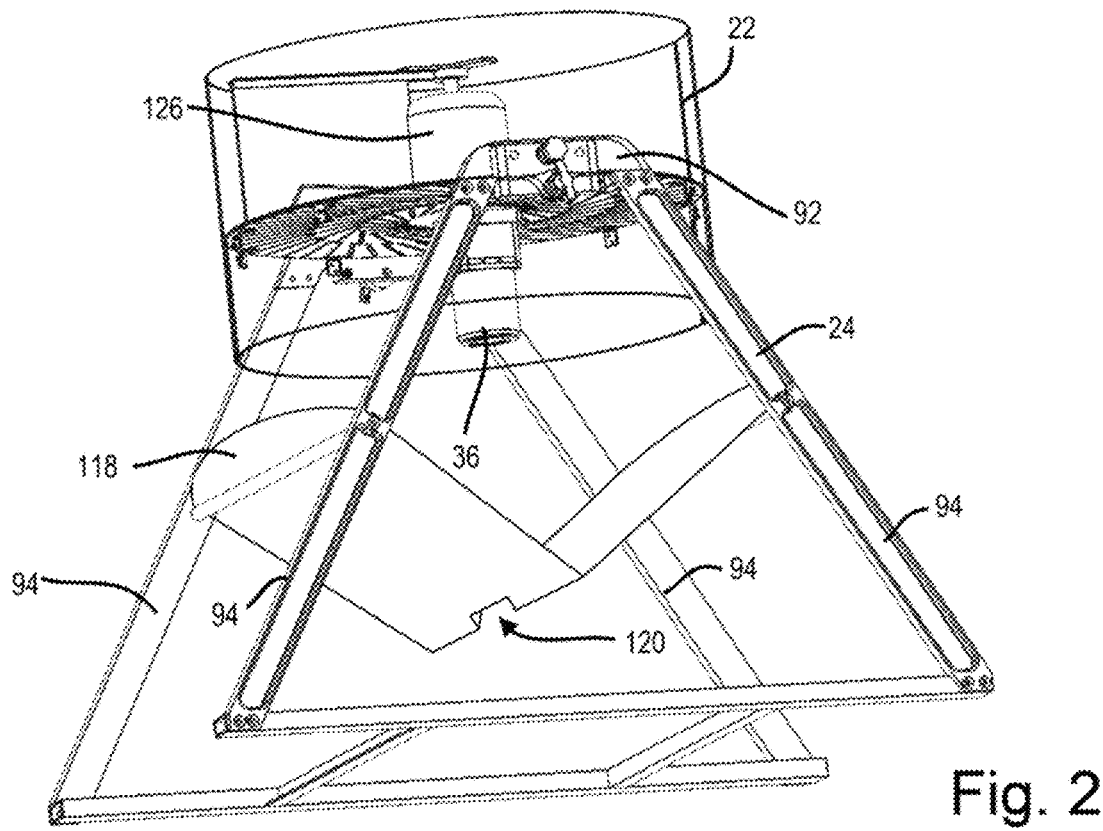
FIG. 2 is another perspective view of the example shown in FIG. 1 with a catch tray.
Figure 3:
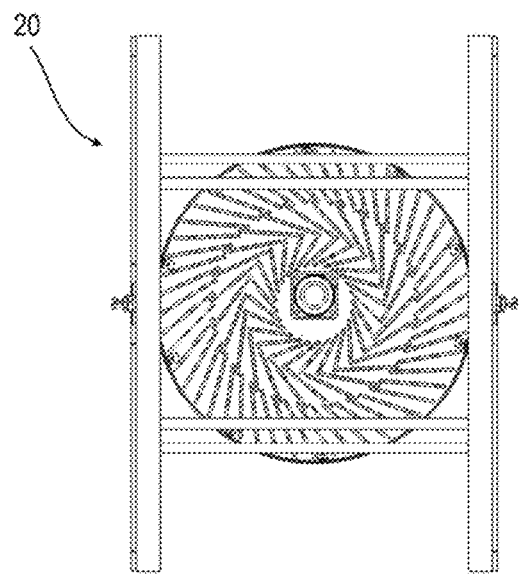
FIG. 3 is a bottom view of the example shown in FIG. 1.

FIGS. 1 and 2 show a brush hub 110 having a plurality of brush arms 112 extending radially outward therefrom. In the example shown, each brush arm 112 is shown with a brush 114 extending therefrom substantially to the upper surface of the second disk 50. The brushes 114 rubbing against or just above the second disk 50 so as to remove debris therefrom for more efficient processing in a similar fashion to that shown relative to the lifter arms 106. In one example, the brush hub 110 is fitted to the lifter hub 54 so as to rotate relative to the second disk 50. On one example the brush hub 110, is the fixed relative to the second disk 50. In another example the brush hub 110 is fixed to the drum 22.

Figure 4:
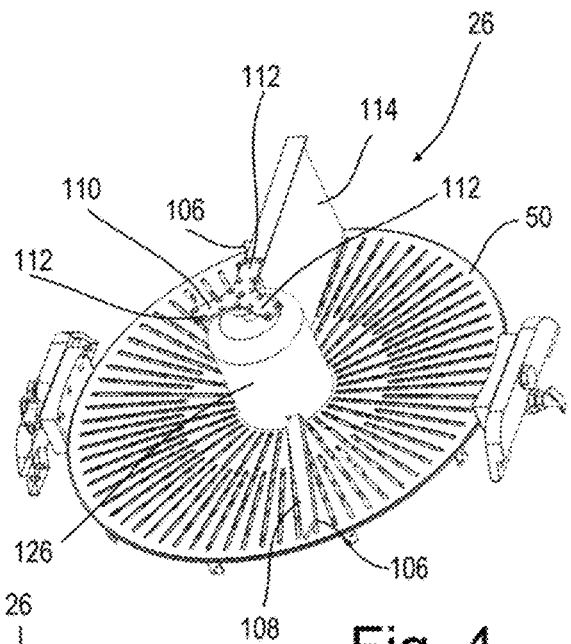
FIG. 4 is a top perspective view of several components of the example shown in FIG. 1.

In one example, shown in FIG. 4, a center component 126 positioned in the center of the drum 22. The center component 126 in one example removably attached to the lifter hub 54. In one example the center component 126 has a smooth, substantially cylindrical outer surface ensuring that the plant matter engages the voids 60/64 in the second disk 50 and substantially does not engage the second disk 50 radially inward of the voids 60/64. In one example, the center component is attached to the lifter hub 54 via a ball and socket connection allowing easy removal from the lifter hub 54.

In one example, the brush hub 110 is attached to an upper portion of the center component 126 so as to freely rotate thereto. As the brush hub 110 and attached brushes 114 are free to rotate, they will tend to rotate as they are pushed by plant matter 28, contact with the second disk 50, and lifter arms 106. A brush stop 128 may be provided to stop rotation of the brushes 114. The brush stop 128 may in one example be attached to the inner surface of the drum 22. Thus, as a brush 114, bush arm 112, or other structure contacts the stationary brush stop 128, the bush will not rotate past the brush stop 128. In one example the brush stop may only contact 1, 2, 3, bushes 114 allowing for rotation of the brushes 114 through less than 360°, less than 240°, less than 120°, etc.

In one example, the control board 42 including a reversing switch, engaged periodically to clear the cutter assembly of plant material from a non-efficient status. This will in one example cause the brush hub 110 and attached brushes 114 to rotate until they contact the brush stop 128.

In one example, as can be understood by looking to FIG. 13 gearing may be provided in a gearbox 116 such that the second disk 50, lifter arm 106, and brush hub 110 may all rotate in different directions or speeds relative to the drum 22. In other examples, components may rotate together. For example, the brush hub 110 may rotate at the same direction and speed as the lifter arms 106.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A rotary plant cutter comprising:
a base frame;
a drum supported by the base frame;
a first disk mounted within the drum and fixed to the drum;
a second disk mounted within the drum adjacent to and above the first disk;
the second disk configured to rotate relative to the first disk about a rotational axis;
the second disk having surfaces defining a plurality of second disk linear slots through the second disk, these second disk linear slots aligned tangential to the rotational axis of the second disk;
the first disk having surfaces defining a plurality of first disk linear slots through the first disk, these first disk linear slots aligned radial to the rotational axis of the second disk;
a drive unit having a housing fixed to the drum; and
the drive unit having a shaft coupled to rotate the second disk relative to the first disk.

2. The rotary plant cutter as disclosed in claim 1 wherein the first disk is in continuous contact with the second disk.

3. The rotary plant cutter as disclosed in claim 1 wherein at least some of the first disk linear slots disk extend radially at least 75% of the radius of the first disk.

4. The rotary plant cutter as disclosed in claim 1 further comprising a first brush positioned above the second disk and substantially in contact with the second disk.

5. The rotary plant cutter as disclosed in claim 1 wherein the drum is pivotably mounted to the base about a horizontal axis of rotation.

6. The rotary plant cutter as disclosed in claim 5 wherein the drum is rotatably mounted to the base through an angle of greater than 90°.

7. The rotary plant cutter as disclosed in claim 6 comprising a first receiving basket placed under the drum during operation so as to receive cut material passing through the first disk and second disk.

8. The rotary plant cutter as disclosed in claim 7 comprising:
   a second receiving basket placed under the drum during operation; and
   the second receiving basket configured to receive material not passing through the first disk and second disk when the drum is rotated through an angle of greater than 90°.

9. The rotary plant cutter as disclosed in claim 7 comprising:
   a catch tray positioned under the drum during operation;
   the catch tray positioned above the first receiving basket; and
   the catch tray configured to direct plant material from the drum to the first receiving basket.

10. The rotary plant cutter as disclosed in claim 1 further comprising:
    a lifter arm extending outward from the radial center of the second disk toward the drum;
    the lifter arm coupled to the shaft so as to rotate relative to the drum; and
    the lifter arm comprising a forward surface at an angle of between 10° and 80° of the second disk.

11. A rotary plant cutter comprising:
    a base frame;
    a drum supported by the base frame;
    a first disk mounted within the drum and fixed to the drum;
    the first disk having surfaces defining a plurality of radial slots through the first disk;
    a second disk mounted within the drum adjacent to and above the first disk;
    the second disk configured to rotate relative to the first disk about a rotational axis;
    a drive unit having a housing fixed to the drum;
    the drive unit having a shaft coupled to rotate the second disk relative to the first disk; a first brush positioned above the second disk and substantially in contact with the second disk; and
    wherein the first brush rotates relative to the second disk.

12. The rotary plant cutter as disclosed in claim 11 comprising a second brush positioned above the second disk and substantially in contact with the second disk, the second brush circumferentially offset from the first brush.

13. The rotary plant cutter as disclosed in claim 12 comprising a third brush positioned above the second disk and substantially in contact with the second disk, the third brush circumferentially offset from the first brush and the second brush.

14. The rotary plant cutter as disclosed in claim 11 wherein the first brush rotates relative to the drum.

15. The rotary plant cutter as disclosed in claim 11 wherein the first brush is coupled to the shaft of the drive unit to rotate relative to the drum.

16. A rotary plant cutter comprising:
    a base frame;
    a drum supported by the base frame;
    a first disk mounted within the drum and fixed to the drum;
    the first disk having surfaces defining a plurality of radial slots through the first disk;
    a second disk mounted within the drum adjacent to and above the first disk;
    the second disk configured to rotate relative to the first disk about a rotational axis;
    a drive unit having a housing fixed to the drum;
    the drive unit having a shaft coupled to rotate the second disk relative to the first disk;
    a lifter arm extending outward from the radial center of the second disk toward the drum;
    the lifter arm comprising a forward surface at an angle of between 10° and 80° of the second disk; and
    wherein the lifter arm is mounted to rotate about the rotational axis of the second disk.

17. The rotary plant cutter as disclosed in claim 16 wherein the lifter arm is mounted to rotate about the rotational axis of the second disk at a different angular velocity than the second disk relative to the drum.

* * * * *